May 1, 1956     C. T. HAYES     2,743,529
DRYING OVEN AND OPERATION THEREOF
Filed July 6, 1954     3 Sheets-Sheet 2
FIG. 3.
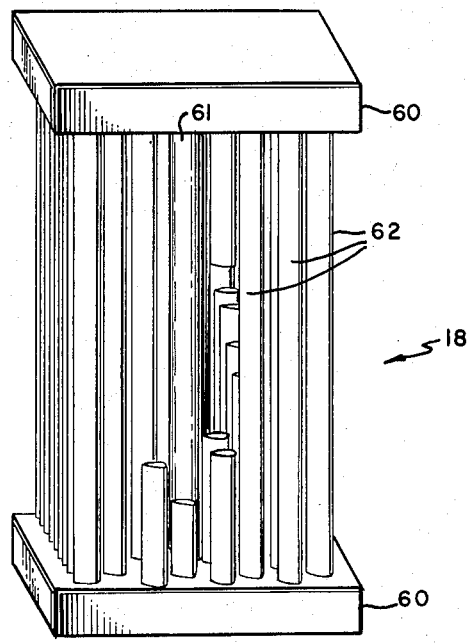
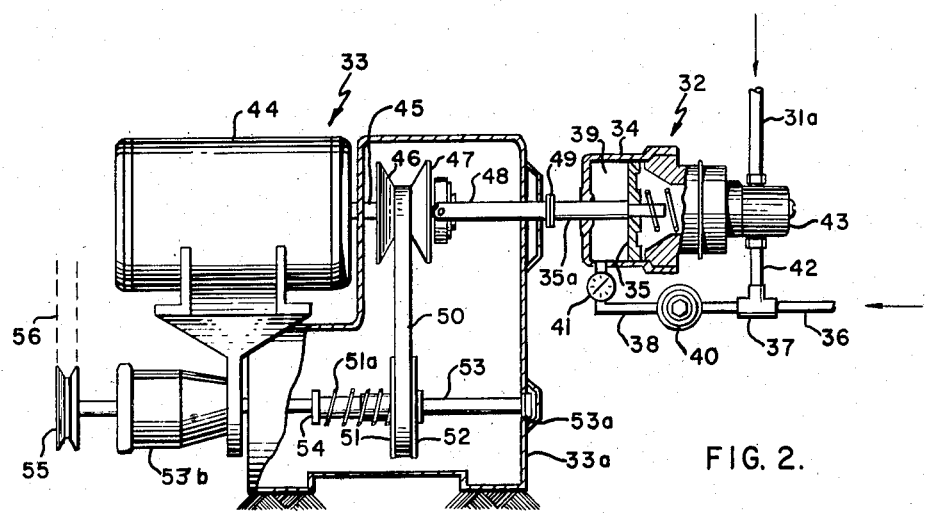
FIG. 2.
INVENTOR.
CLETUS T. HAYES
BY
ATTORNEY INVENTOR.
CLETUS T. HAYES
BY William M. Epes
ATTORNEY

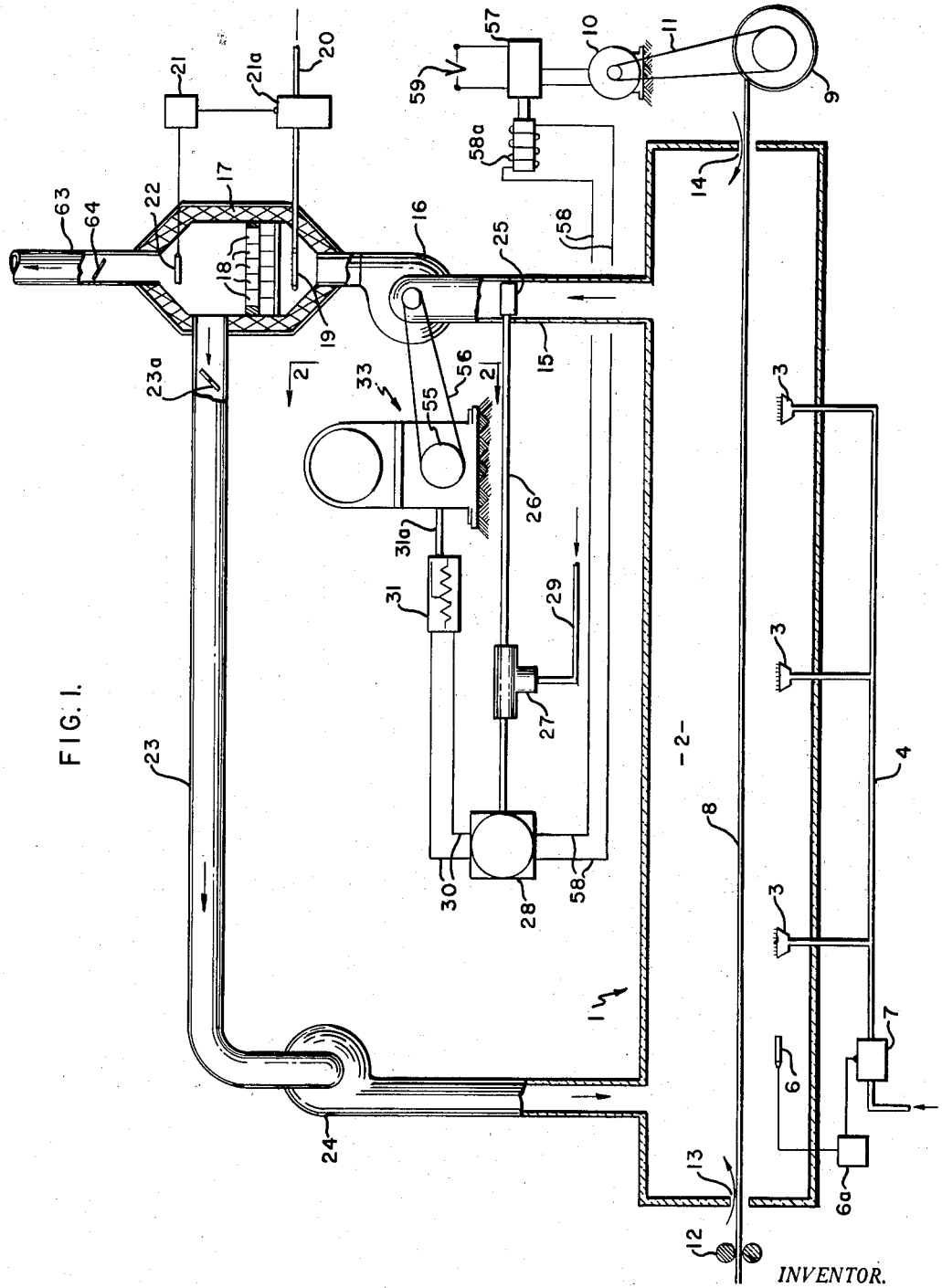

United States Patent Office 2,743,529
Patented May 1, 1956

2,743,529

DRYING OVEN AND OPERATION THEREOF

Cletus T. Hayes, Philadelphia, Pa., assignor to Oxy-Catalyst, Inc., a corporation of Pennsylvania Application July 6, 1954, Serial No. 441,327

12 Claims. (Cl. 34—35)

This invention relates to drying and the like ovens of the type in which the oven atmosphere contains volatile combusible gases which are exhausted to the atmosphere.

The flue gases exhausted by drying and other similar types of ovens very often contain malodorous and otherwise obnoxious combusible components such as toluene, xylene, butanol and other alcohols, ketones and mixtures thereof, in such concentrations as to constitute a serious air pollution nuisance. The air pollution problem created is particularly serious in highly industrialized urban districts where the effluent from a large number of ovens might be vented within a relatively small geographical area. This nuisance is receiving increasing attention in industrial cities where restrictions upon air pollution are in some cases being adopted. For this reason persons operating drying and the like ovens are usually concerned with the elimination of the combustible materials from flue gases.

These same flue gases constitute a potentially valuable source of heat by virtue of both their sensible heat and their chemical heat. For example, the effluent from drying and the like ovens is usually at a temperature within the range of about 400° F. to 500° F. If the combustible contaminants, such as toluene, xylene, etc. are oxidized, the heat of combustion released will raise the temperature of the effluent by as much as 600° F. to about 1000° F. or 1100° F. Where effluent from a drying oven is released without recovery of this chemical heat, the air pollution problem described above is created and, of course, a valuable source of heat energy is wasted.

Recovery of the chemical heat contained in oven effluents is rendered difficult because of the fact that the combustible constituents in these effluents are highly diluted with air. This dilution is essential in order to maintain the concentration of volatile combustible matter in the oven atmosphere at a level below the limit of flammability. Obviously if the concentration of the combustibles in the oven atmosphere were to reach the lower limit of flammability there would be an imminent danger of a serious explosion. In conventional and prudent practice this danger is obviated by diluting the oven atmosphere with sufficient quantities of air to maintain a solvent concentration below the limit of flammability. This necessary precaution, however, renders the problem of eliminating the combusible solvents from the oven effluent and utilizing the heat thereof difficult. Since the concentration of solvents is always below the lower limit of flammability, the mixture will, of course, not burn under ordinary conditions.

It has previously been proposed that these volatile combusible contaminants of drying and the like oven effluents might be eliminated by catalytic oxidation thereof, and that the catalytically purified effluent might be recirculated into the oven or otherwise utilized as by regeneration with a waste heat boiler. Catalytic oxidation of the combusible contaminants (as distinguished from flame combustion) can be accomplished with relative ease for the reason that the contaminants can be oxidized catalytically even though their concentration in the effluent is below the lower limit of flammability. Such recirculation or regeneration of the purified effluent presents economically attractive possibilities because of the fact, noted above, that oxidation of the combustible contaminants in the effluent raises its temperature to a considerable degree. The present invention comprises certain improvements in this previously proposed method of purifying or both purifying and utilizing the exhaust effluent from drying ovens. The following description of some phases of the operation of drying ovens and the particular problems involved in the catalytic purification of the effluent of drying ovens is here presented in order that the objects and scope of the present invention might be clearly understood.

Where the combustible components of the effluent from a drying oven are eliminated by catalytic oxidation it is necessary to maintain the catalyst at its effective operating temperature which in the case of practical, presently available catalysts means temperatures of over 600° F. For example, for one type of catalyst described below, the temperature should preferably be maintained at about 900° F. to 1100° F. for efficient cleanup of the effluent. If this operating temperature is not maintained, the combustible components of the effluent will at best be only partially eliminated. The temperature of the catalyst is usually maintained by (a) the sensible heat imparted to the catalyst from the gas stream, and (b) by the heat of combustion liberated upon catalytic oxidation of the oxidizable constituents in the gas stream. As noted above, the effluent from a drying oven is usually at a temperature within the range of about 400° F. to 500° F. When this effluent passes over the catalyst its temperature can be elevated for example to about 1000° F. or 1100° F. if the effluent contains a sufficiently high concentration of combustible constituents. Under these exemplary conditions the catalyst will be maintained at a temperature at which its continued and efficient operation is assured and in addition a purified effluent, containing virtually no volatile combustible constituents, will be made available for recirculative or regenerative processes.

As a practical matter, the exemplary conditions of oven operation outlined above do not always obtain, and as a result certain difficulties arise if it is attempted to catalytically oxidize the combustible constituents in the oven effluent. One of the reasons that these exemplary conditions do not always exist stems from the fact that, noted above, the contaminants are in a highly diluted form since it is necessary to maintain a minimum ratio of combustible volatile matter to effluent in the operation of drying and the like ovens in order to avoid the danger of an explosion. By way of example it is usually necessary to dilute the oven atmosphere with fresh air so that about 10,000 ft.$^3$ of exhaust effluent are provided per gallon of volatile matter. This concentration of volatile combustible matter (1 gallon per 10,000 ft.$^3$ of effluent) approximately corresponds to the safe limit from the standpoint of the explosive hazard for most types of solvents. If the concentration of volatile combustible matter such as toluene, xylene, etc. as mentioned above is maintained at about this level, sufficient quantities of heat will be liberated upon catalytic oxidation thereof to maintain the catalyst at its operating temperature and to yield a purified effluent at a temperature of about 1000° F. to 1100° F. which, as noted above, is valuable for regenerative or recirculative processes. As a practical matter this concentration may fall below the level of about one gallon per 10,000 cubic feet when the nature or the amount of work charged into the oven is changed, for example, if the amount of work charged into the oven is materially decreased or if it is of such nature as to be incapable of providing one gallon of solvent per 10,000 cubic feet of effluent exhausted from the oven. When such changes do take place, the amount of heat liberated per unit time by catalytic oxidation might be reduced to an extent such that the catalyst would not be maintained at its operating temperature. Under these circumstances the catalyst will become inoperative and the volatile combustible components in the effluent will not be eliminated.

The prior art suggests that catalyst operating temperatures can be maintained by providing a burner capable of raising the temperature of a stream of effluent to the operating temperature of the catalyst. It is further suggested in the prior art that such a burner can be controlled in response to the temperature of the effluent which has flowed across the catalyst; that is to say, such a burner would be automatically lighted if these gases fall below a predetermined minimum temperature such as would indicate that the effluent was not being heated by catalytic oxidation. An obvious limitation to such a solution to the problem is that a burner provided for this purpose would require the expenditure of fuel over and above that required for the oven, and would not, therefore, be economically attractive. A more subtle and perhaps more important limitation involves the potential danger of such a system in installations in which the effluent is recirculated. If the catalyst should become poisoned or in like manner be rendered inoperative, and if the effluent containing unoxidized volatile combustibles is recirculated into the oven, the effect would be to raise the concentration of volatile matter in the oven atmosphere since this volatile matter would not be oxidized by the poisoned catalyst. An extremely hazardous condition would result as the concentration of volatile combustible matter would be progressively increased.

It is one of the objects of the present invention to provide optimum catalyst operating conditions without danger of explosion in the elimination of the volatile combustible components of drying oven effluents by catalytic methods.

It is a further object of the invention to provide a method and apparatus for the automatic adjustment of the operation of drying and the like ovens in such manner as to maintain optimum operating conditions without explosive hazards for the catalytic elimination of the volatile combustible components in the effluent from such ovens.

It is a further object of the invention to provide, in the operation of drying and the like ovens in which the volatile combustible components of the effluents are catalytically oxidized and the purified effluent is recirculated into the oven, for the safe operation of such ovens despite any decline in the activity of the catalyst employed.

Further objects of the invention will be apparent from the following description and from the annexed drawings in which:

Fig. 1 is a semi-diagrammatic view of a preferred embodiment of my invention.

Fig. 2 is a semi-diagrammatic vew of the control means of the present invention operative to control the composition of the effluent gases of an oven such as a drying oven.

Fig. 3 is a perspective view of a catalytic unit of the type usable in the practice of the present invention.

Figure 4:
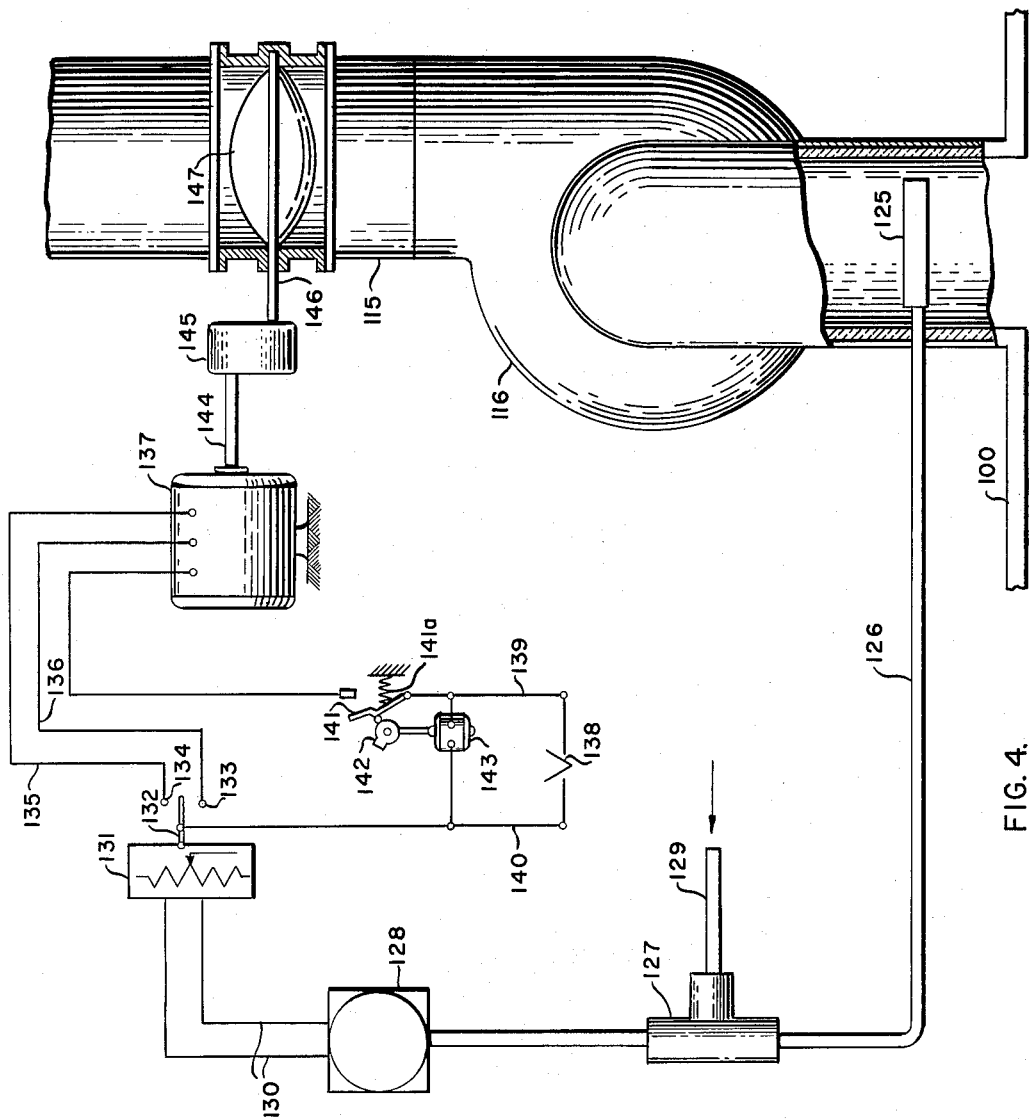
Fig. 4 is a fragmentary semi-diagrammatic view of a modification of the embodiment of Fig. 1.

Broadly speaking, the present invention provides a method and apparatus for controlling the concentration of combustible matter in the exhaust gases of drying and the like ovens, catalytically oxidizing this combustible matter, and utilizing the oxidized exhaust gases to recover their sensible heat. The level of the concentration of the combustibles in exhaust gases is maintained by means of control devices which continuously detect and are responsive to the actual concentration of combustibles in the gases and which control the amount of drying air drawn into the oven. As a result the exhaust from the oven contains the maximum permissible concentration of combustibles from the standpoint of safety, and moreover contains sufficient combustible material to render catalytic oxidation thereof self-sustaining in so far as heat requirements are concerned so that no heat need be supplied from external sources such as burners. The catalyst preferably employed in the practice of the present invention is of a relatively high heat capacity; this fact contributes to optimum economic oven operation in that, in the event of an abrupt lowering of the concentration of combustibles or temperature of the flue gases, the catalyst will not immediately be cooled to a temperature below its activation point, but will remain at an elevated temperature for a period sufficiently long to permit the necessary changes in the flue gases (in their composition and/or temperature) to be effected by the control devices.

Fig. 1 shows a preferred embodiment of the invention adapted to the baking or drying of enameled steel strip. In this embodiment the reference numeral 1 indicates an oven having an oven chamber 2 which is heated by burners 3 supplied with fuel through a fuel line 4. The atmosphere of oven chamber 2 is maintained within predetermined temperature limits, suitable for the enamel baking operation, by a temperature sensing and control means 6, 6a which controls a valve 7 in fuel line 4. Steel strip 8 is pulled through oven chamber 2 and wound upon a spool 9 which is rotated about its axis by a motor 10 connected to spool 9 by a belt 11. The strip 8 passes through guide rolls 12, through an oven inlet port 13 and an oven outlet port 14. During passage of the strip 8 through oven chamber 2 the combustible volatile constituents of the enamel are volatilized, mixed with air which enters the oven chamber through ports 13, 14 and the resultant mixture is exhausted through a duct 15 under the influence of a variable speed exhaust fan 16.

A catalytic chamber 17 is located downstream in duct 15 from fan 16. One or more banks of catalytic units 18, of a type which will be described below, are mounted within chamber 17 in such manner that gases flowing through the chamber are subjected to the action of the catalytic units. Below catalytic units 18 a pre-heat burner 19 is mounted which is supplied with fuel from a line 20. This burner is subject to the control of a controller 21 and valve 21a actuated by a temperature sensing means 22 in a manner described below. A return duct 23 having a damper 23a therein and fan 24 is provided for the purpose of recirculating effluent into oven chamber 2 while a stack 63 equipped with a damper 64 permits exhausting of these gases to the atmosphere when desired.

A control system 25—55 maintains an optimum concentration of volatile combustible matter in the effluent exhausted from the chamber 2 through duct 15 and obviates the danger of an explosion in the event that the concentration of volatile matter should reach a hazardous level. This control system and its mode of operation are more fully described below. In the interest of clarity, the following explanation of the operation of the oven of Fig. 1 under ideal conditions is presented without reference to control system 25.

In the ideal normal operation of the oven shown in Fig. 1, the catalytic units 18 are heated to their operating temperature by pre-heat burner 19 and the atmosphere of the oven chamber 2 is heated to its operating temperature by the burners 3. The flow of strip material 8 through the oven is then initiated by starting motor 10 which pulls the strip through the oven and winds it upon spool 9. The solvents contained on the coating of strip 8 are, of course, volatilized while the strip passes through the oven and mix with air from the atmosphere which enters ports 13 and 14 as indicated by the arrows. The air-solvent mixture is continuously exhausted from the oven by fan 16 and flows into catalytic chamber 17 and over the catalytic units 18. These catalytic units will have the effect of oxidizing the combustible solvents contained in the air-solvent effluent and raising its temperature from approximately 400° F. or 500° F. to about 1000° F. or 1100° F. When this catalytic oxidation process is started the heat of combustion liberated at the catalytic units will maintain these units at their operating temperature and the fuel supplied to pre-heat burner 19 can be cut off. This is automatically accomplished by the control device and valve 21, 21a and temperature sensing means 22 which close valve 21a when the oxidized effluent contacts sensing means 22. The oxidized effluent, at a temperature of about 1000° F. to 1100° F. is then recirculated through duct 23 by means of fan 24 into oven chamber 2. By virtue of the fact that the recirculated effluent is at an elevated temperature the amount of fuel supplied to burners 3 through line 4 can be materially reduced or entirely cut off. This is accomplished by means of temperature sensing means 6, controller 6a and valve 7. In the interest of clarity and simplicity of illustration, Fig. 1 shows the recirculated gases as being directly introduced into the oven chamber. It should be remembered however that these gases are at a temperature (about 1100° F.) considerably in excess of the operating temperature of the oven (about 400° F. to 500° F.). This condition might cause the development of an undesirable hot spot in the oven which, however, can be avoided by merely diluting the recirculated gases with air prior to introduction into the oven or alternatively introducing the hot recirculated gases at a plurality of spaced points within in the oven.

Where it is unnecessary or undesirable to recirculate all of the oxidized effluent, the excess effluent is vented through stack 63. The catalytically oxidized effluent which is vented may be released to the atmosphere with impunity since it does not constitute an air pollution nuisance after destruction by such oxidation of the volatile components. As noted above, this oxidized effluent may be utilized for heat regenerative purposes by means of a waste heat boiler. Under these circumstances the effluent would flow through the stack 63 to the regenerative apparatus. The dampers 26, 23a located in stack 63 and duct 23 respectively permit any desired disposition of the catalytically oxidized effluent; i. e. either partially through both the duct 23 and stack 63 or entirely through one of these elements to the exclusion of the other.

The foregoing explanation of the operation of oven 1 assumes ideal operating conditions which are not at all times achieved in actual practice. More specifically, the foregoing explanation assumes that the effluent exhausted from the oven through duct 15 will at all times carry a nicely adjusted concentration of volatile matter which is sufficiently low to satisfy safety requirements and thereby avoid all danger of explosion, but which is at the same time sufficiently high to provide adequate quantities of heat to maintain the catalytic units 18 at their efficient operating temperature. Actually this concentraion will vary when the operation of the oven is changed. For example, if the amount or size of the strip material 8 charged into the oven per unit time is abruptly changed in such manner that the amount of solvent volatilized per unit time is increased, the combustible solvent concentration within the oven chamber 2 may be raised to or above the lower limit of flammability. On the other hand, if the amount or nature of strip material 8 charged into the oven is changed in such manner that the amount of solvent volatilized per unit time is decreased, the concentration of combustible solvents in the effluent being catalytically oxidized may be lowered to a level at which the amount of heat liberated at the catalytic units 18 will be insufficient to sustain them at their efficient operaing temperature. In the event of the latter exigency, catalytic oxidation of the effluent may cease upon cooling of the units 18 below their operating temperature and could not be started again unless these units were heated by flames from the burner 19, or where a smaller temperature drop occurred the decreased temperature may not be sufficient to provide complete oxidation, with the result that a residual concentration of vapor would remain in the effluent. This could have serious consequences if the effluent were being recirculated through duct 23 since the unoxidized effluent returned to the oven would contain combustible solvents which, added to the solvents in the oven, might raise the concentration to an unsafe level; i. e. above the lower limit of flammability. Even if these same unoxidized solvents are being exhausted to the atmosphere, the air pollution nuisance discussed above is created and the chemical heat of the effluent is wasted.

The control system 25—25 obviates all of the above difficulties of oven operation by automatically maintaining the optimum concentration of combustible solvents in the effluent exhausted through duct 15. The operation of this system and the components thereof will now be described.

The reference numeral 25 denotes a sampling head disposed within duct 15 and adapted to continuously withdraw a sample of the gases flowing in duct 15. This sample flows through a line 26, a three-way valve 27 and into an analyzing head 28. This analyzing head continuously determines the concentration of combustible solvents in the gas stream by catalytic combustion of the sample and determination of the heat liberated by means of thermocouples. A line 29, open to the atmosphere from three-way valve 27, permits purging of the sampling line 26 and analyzing head 28 and calibration of the analyzing head against pure air. The determination of the concentration of volatile combustible matter in the effluent in terms of the E. M. F. of the aforementioned thermocouples is transmitted by means of leads 30 to a potentiometer type controller 31 which transposes this E. M. F. differential into a pneumatic pressure differential. The gas analyzing device 25—28 and the potentiometer controller 31 are of conventional type which are commercially available and need not, therefore, be described here. The gas analyzer, for example, may be of the type manufactured by the Davis Emergency Equipment Co. and the potentiometer-controller of a type produced by the Brown Instrument Co.

The pneumatic pressure variation, produced by controller 31, in response to variations in the content of volatile combustible solvents in the effluent, actuates a pneumatic control device generally indicated by the reference numeral 32 (Fig. 2) which controls a variable speed driving mechanism generally indicated by the reference numeral 33. Fig. 2, which is a view taken in the direction of the arrows 2—2 of Fig. 1 shows details of this control device and driving mechanism with parts broken away in the interest of clarity. As shown in Fig. 2 the pneumatic control device comprises a cylinder 34 and piston 35 which is actuated by compressed air from a line 36. The air line 36 terminates at a T-connection 37, one branch 38 of which leads to a low pressure side 39 of the piston 35. Branch 38 is provided with a regulator valve 40 for the purpose of throttling the high pressure air from line 36 to a lower pressure and a gauge 41. The second branch 42 of the T-connection 37 leads to a positioner 43 mounted on the right hand side of cylinder 34 as viewed in Fig. 2. As shown by the drawing the line 31a from the controller 31 also leads into positioner 43. In the operation of the pneumatic control device 32, the piston 35 is positioned within cylinder 34 in response to varying pressures against the right hand side of the piston as viewed in Fig. 2. The varying pressures are achieved by controlling the compressed air admitted through line 42 by means of the pneumatic pressure in line 31a. The entire pneumatic controller is of a standard type available from the Conoflow Corporation and need not be described in further detail here.

Movement of the piston 35, of course, results in movement of the piston rod 35a. This piston rod controls the action of variable speed drive 33 which, as shown in the drawing, comprises a motor 44 having a shaft 45. An adjustable sheave mounted on shaft 45 comprises a fixed member 46 and a movable member 47. Movable member 47 is connected by means of a yoke 48 and coupling 49 to piston rod 35a. A belt 50 passes over sheave 46, 47 and connects this sheave with a second adjustable sheave 51, 52 mounted on a shaft 53 journaled as at 53a in the housing 33a. Member 51 of this second variable sheave is movable toward and away from fixed member 52. A helical spring 51a which abuts a collar 54 on shaft 53 biases member 51 toward 52. Shaft 53 is provided with a gear box 53b which houses suitable speed reducing gears. A sheave 55 on the end of shaft 53 accommodates a belt 56 (also shown in Fig. 1) which drives fan 16. In the operation of the variable speed drive 33, movement of the piston 35 and piston rod 35a changes the position of movable sheave member 47 relative to fixed sheave member 46. This changes the effective radius of driving sheave 46, 47. The effective radius of driven sheave is also changed by the belt 50 in order to maintain a constant belt length. The result of the changes in the effective radii of the two sheaves, 46, 47 and 51, 52 is that the speed of rotation of shaft 53 and the speed of fan 16 are correspondingly changed.

From the foregoing description of the components of control system 25—55 it is apparent that if the concentration of volatile combustible matter in the effluent samples by sampling head 25 decreases, this decrease will be sensed by the analyzing head 28 and the potential difference in leads 30 will be changed. The potentiometer controller 31 will, as a result, respond by decreasing the pneumatic pressure in line 31a. Responsive to this decrease in pressure in line 31a, the balance of controller 32 will be disturbed and the piston 35 will be moved to the right as viewed in Fig. 2. This movement of the piston 35 will have the result of moving adjustable member 47 to the right and decreasing the effective radius of sheave 46, 47. At the same time the effective radius of sheave 51, 52 will be increased and the rotational speed of shaft 53 will be decreased. When the speed of shaft 53 is decreased the speed of pulley 55, belt 56 and fan 16 will be correspondingly reduced. The reduction of the speed of this fan 16 will result in a lowering in the amount of air drawn into oven chamber 2 through ports 13, 14 and a corresponding increase in the ratio of volatile matter to air. Obviously, if the concentration of volatile matter in the effluent is increased, the control system 25—55 will compensate for this change by increasing the speed of fan 16 to draw a greater amount of air through ports 13, 14.

In the event that the concentration of volatile combustible matter in the effluent should become unduly high and approach an unsafe level, a solenoid switch 57 is provided for the purpose of stopping the travel of material 8 through the oven chamber. As previously noted, in the event of failure of the catalytic units 18, recirculated effluent containing unoxidized volatile matter will tend to raise the concentration of effluent to a dangerous level. The switch 57 obviates all danger of this exigency. As shown in Fig. 1, this switch is controlled by the continuous gas analyzer as indicated by leads 58 and coil 58a and is adjusted to be opened when the analyzer records an unsafe concentration. Upon opening of switch 58 the power supply 59 for motor 10 is cut off, thus stopping rotation of spool 9.

It is evident from the above discussion that the end result of the operation of control system 25—55 is to maintain a relatively uniform concentration of volatile matter in the effluent exhausted from the oven through duct 15. By proper adjustment of the various components of the control system this concentration can be maintained at a level which is sufficiently high to assure continuing operation of the catalytic units 18, but which is at the same time below the lower limit of flammability. In the event that the concentration of volatile matter in the oven effluent becomes dangerously high the operation of the oven will be stopped by switch 57.

Fig. 4 shows a modified embodiment of the invention in which the concentration of combustible solvents in the oven exhaust is maintained within the prescribed limits by means of a damper. In this embodiment the oven 100 is provided with an exhaust duct 115 having a sampling head 125 disposed therein. A line 126 leads from sampling head 125 to an analyzing head 128. This line is provided with a three way valve 127 which permits purging and calibration of analyzing head 128 with air from the atmosphere admitted through a second line 129. The sampling and analyzing device 125—129 is of the same type described with reference to Fig. 1.

The E. M. F. developed by this analyzing head, which is proportional to the concentration of combustible vapors in the exhaust gases, is transmitted by means of leads 130 to a millivoltmeter 131 provided with a contacting device 132. This contacting device is electrically connected with one side 140 of a line from a source 138 of electrical power. Contacting device 132 is adapted to contact either of two fixed contacts 133, 134 which are provided with leads 135, 136 which in turn are connected with a split field type motor 137 the shaft 144 of which can be rotated in either direction depending upon which one of its windings is electrically activated. Line 139 from power source 138 is connected to motor 137 through an intermittent contacting switch 141. As shown in the drawing, switch 141 is normally maintained open by spring 141a but is intermittently closed by cam 142 which is continuously rotated by motor 133 connected across lines 139, 140. Power is then supplied to motor 137 only during such time contacting device 132 contacts one of the fixed contacts 133, 134 and switch 141 is closed by cam 142.

Motor 137 is provided with a shaft 144 which is connected through a suitable speed reducing device 145 to a second shaft 146 which in turn controls a damper 147 disposed in conduit 115. It is understood, of course, that a catalytic chamber similar to chamber 17 of Fig. 1 is provided downstream from damper 147 and that the structure shown in Fig. 4 is intended for use with an oven of the type shown in Fig. 1. The fan 116 of Fig. 4 is not, however, provided with automatic speed adjustment means as in the embodiment of Fig. 1. As will be apparent from the following explanation, fan 116 is adapted to operate at a constant speed despite changes in the concentration of combustible vapors in the gases.

In the operation of the embodiment of Fig. 4, the effluent flowing in duct 115 is continuously sampled by sampling head 125. The concentration of combustible vapors in the effluent sample is determined by analyzing head 128 and the results of this analysis, in terms of an E. M. F., are communicated to millivoltmeter 131. If the concentration of combustible vapors is not within the proper limits for safe and efficient operation as described hereinabove, millivoltmeter 131 will respond by actuating movable contacting device 132 to contact one of the fixed contacts 133, 134. As a result power will be supplied through one of the two leads 135, 136 and the circuit of motor 137 will be closed. This will have the effect of changing the position of damper 147 to permit a greater or a lesser amount of effluent to be exhausted from oven 100 per unit time. With the constant speed fan 116, the amount of effluent exhausted from the oven per unit time will of course determine the rate at which air is drawn into the oven. Obviously then, if the concentration of combustible vapors is unduly high, damper 147 will automatically be opened by motor 137 to a greater degree than its initial setting and the amount of air drawn into the oven and the amount of effluent exhausted from the oven per unit time will be increased. As a result, the concentration of combustible vapors in the effluent will be decreased. If on the other hand, the concentration of combustible vapors should fall to a level insufficient to sustain operation of the catalyst, damper 147 will be automatically closed to a greater degree than its initial setting thus causing the concentration of combustible vapors in the effluent to be increased.

Intermittent switch 141 and speed reducing device 145 are provided for the purpose of preventing "hunting" on the part of the control system for the proper setting for a particular set of conditions. By proper selection of the cam 142 and the speed reducing device 145 the speed of response of damper 147 to changes in the concentration of combustible vapors in the effluent can be decreased to the extent that damper 147 will be reset for a change in vapor concentration without "cycling."

It is understood that the present invention is not limited to a particular catalyst, and that the principles thereof are applicable to any suitable oxidation catalyst. A particular ctalyst which will yield eminently satisfactory results, however, consists of a unit 18 of the type shown in Fig. 3 consisting of a pair of end plates 60 which are rigidly secured to each end of a spacer bar 61. A plurality of rod like elements 62 are supported between end plates 60 in apertures provided therein. At least one end of each element 62 is freely mounted in its aperture with sufficient clearance being provided to permit thermal expansion and contraction without stressing or fracture. The unit 18 is preferably constructed of ceramic material such as porcelain of the quality used in the manufacture of spark plugs. The rod like elements 62 are coated with a superficial coating of catalytic alumina which is impregnated with about 1% to 2% platinum based on the weight of the alumina coating. Catalysts of this type which are extremely durable, both physically and chemically, are described more fully in the copending application of Eugene J. Houdry, Serial Number 312,152, filed September 29, 1952, for Catalytic Structure and Composition.

Porcelain units of the type shown in Fig. 3 have a relatively high heat capacity of the order of 0.3 B. t. u./lb./° F. This makes them particularly adapted to the present invention for the reason that they will remain at a relatively elevated temperature for sufficient time after a reduction in the calorific value of the flue gases for the control system to effect the necessary variation of the speed of fan 16. For example, if the nature of the work 8 in Fig. 1 is abruptly changed so that reduced amounts of combustible matter are volatilized in the oven, the concentration of combustibles in the exhaust gases will be correspondingly reduced, and may be reduced to a level which will not sustain catalytic oxidation in the units 18. If this happens the temperature of the catalyst will fall rapidly if it is of a low heat capacity, and the addition of extraneous heat to the units would be required to reestablish the self-sustaining catalytic oxidation of the gases. On the other hand, with the high heat capacity porcelain units of the type shown in Fig. 3, the temperature of the catalyst will remain at the activation temperature for protracted time during which the control system 25—55 will regulate the fan speed in such manner as to effect a restoration of a combustible concentration in the gases capable of sustaining the catalytic reactions.

The principles of the present invention are, of course, applicable to ovens of types other than the oven disclosed in Fig. 1, and to processes other than the process shown in Fig. 1. The burners 3 (Fig. 1) might be disposed in a separate combustion chamber separate from the oven rather than within the oven as shown. In conventional practice the oven is heated by continuous circulation of the oven atmosphere through such a combustion chamber. The material to be treated in the oven might be carried therethrough on a conveyor, or the oven itself might be adapted to treat material in batches. The present invention would offer particular advantages in batch-type ovens adapted to volatilize solvents because of the fact that in such ovens the amount of solvents volatilized per unit of time tends to decrease as the drying or baking operation nears completion. With the present invention the amount of air drawn into the oven would be regulated to compensate for such changes.

Other obvious modifications within the scope of the invention as set forth in the following claims will be apparent to those skilled in the art.

I claim:

1. In the operation of a drying oven wherein combustible vapors are evolved, the process of eliminating and utilizing said vapors comprising the steps of flowing air from the atmosphere into the oven and in contact with the material being dried to produce a first resultant mixture of combustible vapors and drying air, passing said first resultant mixture over an oxidation catalyst to catalytically oxidize the combustible vapors therein and to produce a second resultant mixture at an elevated temperature substantially free of combustible vapors, recirculating at least a portion of said second resultant mixture into the oven, continuously analyzing said first resultant mixture to detect the concentration of combustible vapors therein, and regulating the flow of drying air into the oven in accordance with the thus detected vapor concentration so as to maintain a predetermined vapor concentration in said first resultant mixture less than that which will produce an explosive mixture but sufficient when said vapors are oxidized at the surface of said oxidation catalyst to maintain said catalyst at an efficient temperature of operation.

2. In the operation of a drying oven wherein combustible vapors are evolved, the process of eliminating and utilizing said vapors comprising the steps of flowing drying air from the atmosphere into the oven and in contact with the material being dried to produce a first resultant mixture of combustible vapors and drying air, passing said first resultant mixture over an oxidation catalyst to catalytically oxidize the combustible vapors therein and to produce a second resultant mixture at an elevated temperature substantially free of combustible vapors, utilizing the sensible heat of at least a portion of said second resultant mixture, continuously analyzing said first resultant mixture to detect the concentration of combustible vapors therein, and regulating the flow of drying air into the oven in accordance with the thus detected vapor concentration so as to maintain a predetermined vapor concentration in said first resultant mixture less than that which will produce an explosive mixture but sufficient when said vapors are oxidized at the surface of said oxidation catalyst to maintain said catalyst at an efficient temperature of operation.

3. In the operation of a drying oven wherein combustible vapors are evolved, the process of eliminating and utilizing said vapors comprising the steps of flowing drying air from the atmosphere into the oven and in contact with the material being dried to produce a first resultant mixture of combustible vapors and drying air, exhausting said first resultant mixture from the oven by means of a variable speed exhaust fan, passing said first resultant mixture over an oxidation catalyst to catalytically oxidize the combustible vapors therein and to produce a second resultant mixture at an elevated temperature substantially free of combustible vapors, utilizing the sensible heat of at least a portion of said second resultant mixture, continuously analyzing said first resultant mixture to detect the concentration of combustible vapors therein and varying the speed of the fan in accordance with said analyzing step to vary the rate of admission of drying air into the oven and thereby maintain a predetermined vapor concentration in said first resultant mixture less than that which will produce an explosive mixture but sufficient when said vapors are oxidized at the surface of said oxidation catalyst to maintain said catalyst at an efficient temperature of operation.

4. In the operation of a drying oven wherein combustible vapors are evolved, the process of eliminating and utilizing said vapors comprising the steps of flowing drying air from the atmosphere into the oven and in contact with the material being dried to produce a first resultant mixture of combustible vapors and drying air, exhausting said first resultant mixture from the oven, passing said first resultant mixture over an oxidation catalyst to catalytically oxidize the combustible vapors therein and to produce a second resultant mixture at an elevated temperature substantially free of combustible vapors, utilizing the sensible heat of at least a portion of said second resultant mixture, continuously analyzing said first resultant mixture to detect the concentration of combustible vapors therein, varying the setting of a damper in accordance with said analyzing step to vary the flow of said drying air whereby the concentration of combustible vapors in said first resultant mixture is maintained at a level less than that which will produce an explosive mixture but sufficient when said vapors are oxidized at the surface of said oxidation catalyst to maintain said catalyst at an efficient temperature of operation.

5. A method of catalytically oxidizing the combustible components of oven gases and recovering at least a portion of the sensible heat contained in said gases comprising the step of analyzing said gases, intermixing a controlled volume of air with said gases, varying said controlled volume of air in accordance with said analyzing step to maintain a ratio of air to combustible components less than that which will produce an explosive mixture but sufficient when said combustible components are oxidized on the surface of an oxidation catalyst to maintain the catalyst at an efficient temperature of operation, flowing said gases over an oxidation catalyst to catalytically oxidize the combustible components therein, and recovering at least a portion of the sensible heat of said gases after catalytic oxidation thereof.

6. A method of catalytically oxidizing the combustible components of oven gases and recovering at least a portion of the sensible heat contained in said gases comprising the step of analyzing said gases, intermixing a controlled volume of air with said gases, varying said controlled volume of air in accordance with said analyzing step to maintain a ratio of air to combustible components less than that which will produce an explosive mixture but sufficient when said combustible components are oxidized on the surface of an oxidation catalyst to maintain the catalyst at an efficient temperature of operation, flowing said gases over an oxidation catalyst to catalytically oxidize the combustible components therein, and recirculating at least a portion of said gases after catalytic oxidation thereof to recover the sensible heat therein.

7. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, continuous gas analyzing means operative to detect the concentration of combustible vapors in said mixture, control means responsive to said gas analyzing means operative to vary the amount of air admitted into said oven chamber in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation and means for utilizing said mixture after catalytic oxidation of the combustible solvents therein.

8. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, continuous gas analyzing means operative to detect the concentration of combustible vapors in said mixture, control means responsive to said gas analyzing means operative to vary the amount of air admitted into said oven chamber in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation, and means for recirculating at least a portion of said mixture after catalytic oxidation of the combustible solvents therein whereby the amount of fuel required to maintain said oven at its operating temperature is materially decreased.

9. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, continuous gas analyzing means operative to detect the concentration of combustible vapors in said mixture, control means responsive to said gas analyzing means operative to vary the amount of air admitted into said oven chamber in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation, means for recirculating at least a portion of said mixture after catalytic oxidation of the combustible solvents therein, and means, responsive to said analyzing means, operative to shut down said oven in the event that the concentration of combustible solvents in said mixture attains explosive proportions.

10. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, damper means operative to vary the rate of air admission into said oven chamber, continuous gas analyzing means operative to detect the concentration of combustible vapors in said mixture, control means responsive to said gas analyzing means operative to vary the setting of said damper in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation.

11. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, a fan operative to draw said air into said oven chamber and to exhaust said mixture from said oven chamber through said duct, continuous gas analyzing means operative to detect the concentration of combustible vapors in said mixture, control means responsive to said gas analyzing means operative to vary the speed of said fan in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation.

12. A drying oven having catalytic fume elimination means and control means therefor comprising an oven chamber having means for admitting air from the atmosphere thereinto whereby a mixture of air and combustible vapors is produced, a catalytic chamber having an oxidation catalyst therein, a duct connecting said oven chamber and said catalytic chamber and permitting the flow of said mixture from said oven chamber into said catalytic chamber, continuous gas analyzing means operative to detect the concentration of combustible vapors in said mixture and control means responsive to said gas analyzing means operative to vary the amount of air admitted into said oven chamber in such manner as to maintain the concentration of combustible vapors in said mixture at a level less than that which will produce an explosive mixture but sufficient when said vapors are oxidized at the surface of said oxidation catalyst to maintain said catalyst at a temperature of efficient operation whereby catalytic oxidation of said combustible vapors is thermally self-sustaining during normal oven operation.

References Cited in the file of this patent

UNITED STATES PATENTS

| | | |
|---|---|---|
| 1,779,569 | Thompson | Oct. 28, 1930 |
| 2,346,437 | Krogh | Apr. 11, 1944 |
| 2,658,742 | Suter et al. | Nov. 10, 1953 |